G., W., A., E. & F. HANLON.
Velocipede.
No. 3,297. Reissued Feb. 9, 1869.
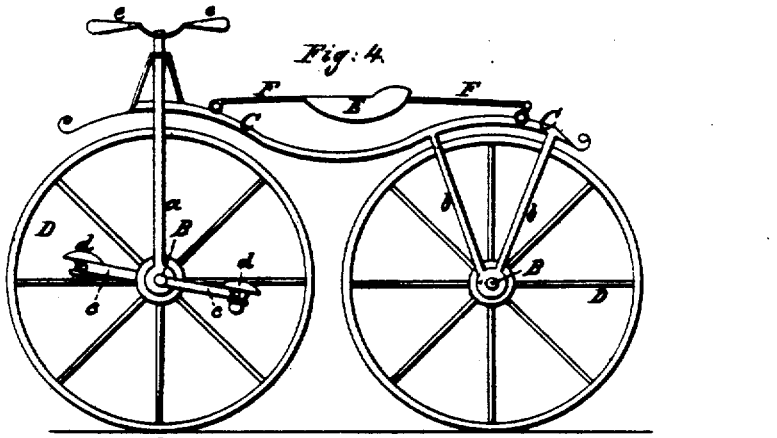
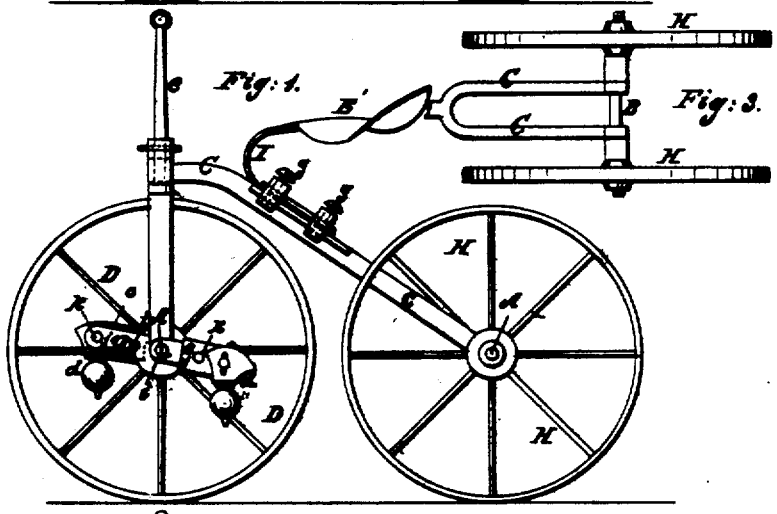
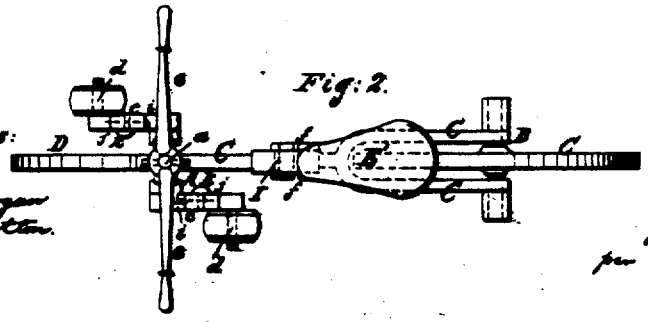
Witnesses:
Wm. A. Morgan
G. G. Foster
Inventors:
G. Hanlon
W. Hanlon
A. Hanlon
E. Hanlon
F. Hanlon
per Munn & Co
attorneys United States Patent Office.

WILLIAM HANLON AND EDWARD HANLON, OF NEW YORK, N. Y., ASSIGNEES OF GEORGE, WILLIAM, ALFRED, EDWARD, AND FREDERICK HANLON.

*Letters Patent No.* 79,654, *dated July* 7, 1868; *reissue No.* 3,297, *dated February* 9, 1869.

IMPROVEMENT IN VELOCIPEDE.

The Schedule referred to in these Letters Patent and making part of the same.

Our invention relates more particularly to certain new and useful improvements in that kind of velocipede which is generally made and used with only two wheels.

To the use of this kind of velocipede, which is propelled by means of cranks attached to the axle of the forward wheel, (manipulated by the feet of the rider,) as heretofore made, many serious objections have been found to exist, among which are the impracticability of balancing the carriage by the beginner, its inadaptability to persons of different sizes, and its weight and clumsiness, when made sufficiently strong.

To overcome these objections, and provide, for use, a velocipede which may be easily balanced by the novice, may be used by different-sized persons with equal facility and comfort, and which will be lighter, and in every way more desirable than machines heretofore made, are the objects of our invention; and to these ends, Our invention consists in so constructing a carriage and adapting to it a shifting rear axle, or axles, and wheels, that it may be arranged or adjusted by the rider, to be used with either one or two wheels in the rear, according to the skill of the person by whom the carriage is to be used, as will be hereinafter more fully explained.

And our invention further consists in making the saddle, or seat, adjustable toward and from the handle and treadles, (or foot-cranks,) to adapt the machine to the use of persons of different sizes.

And our invention further consists in the employment of variable, or adjustable, crank-arms, for the purpose of varying the throw of the treadles, to suit different riders, and to increase or diminish the leverage and velocity of the foot-pieces, or stirrups, as will be presently more fully explained.

And our invention further consists in the use of a forked or bifurcated perch, or bar, substantially such as hereinafter described, in lieu of the frame-work heretofore used, to hold the rear axle and form the body of the velocipede, as will be hereinafter more fully explained.

To enable those skilled in the art to make and use our invention, we will proceed to describe the construction and operation of one of our improved velocipedes.

In the accompanying drawings—

Figure 1 is a side view, or elevation, of our improved machine;

Figure 2 is a top view of the same; and

Figure 3 is a detail partial top view, showing the adaptation of the double running gear at rear of carriage.

At Figure 4, we have illustrated, (in red,) by side elevation, the two-wheel velocipede in use prior to our invention, and to which we shall allude hereinafter.

In figs. 1, 2, and 3, the same parts are designated by the same letters of reference.

A and B are, respectively, the front and rear axles of the carriage, and

C is the perch, or body, the rear or hind portion of which is made forked, or bifurcated, (as clearly illustrated in the drawings,) and is provided or formed with suitable bearing-boxes, for the reception of the axle B.

The front axle A is suitably hung in the lower end of the straddle or frame *a*, which is arranged to swivel in and supports the forward end of the perch, or body of the carriage, in the usual manner.

D is the forward wheel, and

G and H H, the single and double hind wheels, which are used as needed, as will be presently explained.

E is the saddle, or seat, which is formed on, or attached to a spring-bar I, as shown.

This seat-bar, or bracket, I, is connected to the perch C, by means of clamps *f f* and set-screws *g g*, in such a manner that it can be adjusted to, and secured at different points or places on said bar C, at pleasure.

Each of the cranks *c*, to which are pivoted, in the usual manner, the foot-rests, or stirrups, *d*, is made in two parts, *i* and *j*, the former being in each case attached rigidly to the axle A, and the latter coupled, by means of a screw, *k*, to the former.

The attachment of the parts *i j* together is made, as illustrated, by means of the set-screw *k* projecting from *i*, through a slot, *x*, (see fig. 1,) in *j*, the head of said screw bearing on the portion *j*, and clamping it firmly to *i*. By this (or some other equivalent would answer) means, the throw, or length, of the crank can be made greater or less, at pleasure, by adjusting the parts *i* and *j* on each other.

The straddle, or steering-frame, *a*, is of course provided with suitable handles, or arms, by means of which it is conveniently turned.

When the machine is to be used by a novice, (or when the rider begins,) it may be adjusted, or have its running gear arranged in the rear, with the two wheels H H, so that no expertness is required to balance the machine, (on all its wheels.)

After the rider shall have learned to work the cranks and steering-mechanism expertly, he can then remove the axle B and wheels H, and, placing one of said wheels between the forks of perch B, as seen at G, fig. 2, put in the axle again, and practise with two wheels only, in lieu of three.

The axle B may be made so as to fit snugly to the eyes, or hubs, of the perch C, and the wheels H be made to turn free on said axle. And, in lieu of having the projecting or protruding ends of axle B, when one of the wheels H is used, a separate and shorter axle may be made to go with each machine, when sold, such as shown at B, fig. 2.

Of course the hubs, or eyes, of the perch C, in which the axle B is used, may be made of any desired length to throw the wheels far enough apart to suit the beginner, using the double running gear behind.

It will be seen that, by constructing and adapting the parts so that the carriage may be adjusted to run with either one or two wheels behind, as shown and described, the velocipede is rendered much more useful and desirable, less dangerous to the novice, and hence, much more useful to the public.

The old-fashioned velocipede, such as seen at fig. 4, having a heavy frame, or body, C, with double side-pieces or frame, *b b*, for the reception of the rear axle, is heavy, clumsy, and requires more stock and expense in its manufacture than does ours.

And the seat E and cranks, not admitting of any adjustment or variation, it has been necessary to have the machine constructed of just the given or proper size to suit the rider who had to use it.

It will be seen that, by having the seat E′ adjustable, as shown and described, we are enabled to adjust one machine so that it can be used with equal facility by different persons, (having longer or shorter legs and arms,) and it will be understood that this is a great desideratum; and further, that the expert rider can adjust his seat (and consequently his relative position with the driving and steering-mechanism) to a different position than that found most convenient when he was learning on the same machine, which is also very desirable.

Since the same velocity may be obtained in the machine with small cranks, moving in a small circle, as with larger ones, moving through a larger circle, by the application of more power, and *vice versa*, the advantages of having the throw of the cranks variable, or adjustable, are numerous, and will be obvious to the rider; and with expert riders, the great advantages of the adjustable cranks, to adapt the machine to different evolutions, and to the kind of riding, (or character of the road to be ridden over,) will be most apparent.

Of course, the details of construction and shapes of the several parts, may be varied and designed differently from what we have shown, and one or more of the features of our invention may be used without the rest, with considerable advantage.

What we claim as new, and desire to secure by Letters Patent, is—

A velocipede constructed so that it can be converted from a three-wheel to a two-wheel velocipede, and *vice versa*, by means substantially as and for the purposes set forth.

Also, the adjustable or variable saddle, or seat, as and for the purposes described.

Also, making the driving-cranks of a velocipede variable, as and for the purposes described.

Also, making the body of a velocipede, substantially as described, of a bifurcated, or forked bar, or perch, as set forth.

In testimony whereof, we have hereunto set our hands and seals, this 26th day of December, 1868.

WM. HANLON. [L. S.]
EDW'D HANLON. [L. S.]

Witnesses:
CHAS. A. SCOTT,
FREDERIC A. SAYER.